(12) United States Patent
Chen

(10) Patent No.: US 9,258,543 B2
(45) Date of Patent: Feb. 9, 2016

(54) METHOD AND DEVICE FOR GENERATING THREE-DIMENSIONAL IMAGE

(75) Inventor: Chien-Hung Chen, Changhua County (TW)

(73) Assignee: ALTEK CORPORATION, Hsinchu (TW)

( * ) Notice: Subject to any disclaimer, the term of this patent is extended or adjusted under 35 U.S.C. 154(b) by 853 days.

(21) Appl. No.: 13/489,464

(22) Filed: Jun. 6, 2012

(65) Prior Publication Data

US 2013/0258055 A1  Oct. 3, 2013

(30) Foreign Application Priority Data

Mar. 30, 2012  (TW) .............................. 101111399 A

(51) Int. Cl.
*H04N 13/00* (2006.01)
(52) U.S. Cl.
CPC ....... *H04N 13/0029* (2013.01); *H04N 13/0048* (2013.01)
(58) Field of Classification Search
CPC .......... H04N 13/0239; H04N 13/0497; H04N 13/0051
USPC ................................................ 348/42, 46, 47
See application file for complete search history.

(56) References Cited

U.S. PATENT DOCUMENTS

| | | | |
|---|---|---|---|
| 5,510,832 A * | 4/1996 | Garcia ............................. | 348/56 |
| 6,215,898 B1 * | 4/2001 | Woodfill et al. ............... | 382/154 |
| 6,236,428 B1 * | 5/2001 | Fukushima ...................... | 348/42 |
| 7,956,886 B2 * | 6/2011 | Murayama ....................... | 348/42 |
| 8,049,775 B2 * | 11/2011 | Maeda .............................. | 348/47 |
| 8,508,601 B2 * | 8/2013 | Kusanagi ................. | 348/208.11 |
| 8,587,691 B2 * | 11/2013 | Takane ....................... | 348/229.1 |
| 8,754,940 B2 * | 6/2014 | Belsarkar et al. ............. | 348/143 |
| 2002/0118969 A1 * | 8/2002 | Kanade et al. ................ | 396/322 |
| 2007/0085903 A1 * | 4/2007 | Zhang .............................. | 348/58 |
| 2007/0103590 A1 * | 5/2007 | Azar et al. ..................... | 348/459 |
| 2007/0283053 A1 * | 12/2007 | Liu et al. ......................... | 710/11 |

(Continued)

FOREIGN PATENT DOCUMENTS

WO  WO 2011099296 A1 *  8/2011
WO  WO 2011155212 A1 *  12/2011

*Primary Examiner* — Christopher S Kelley
*Assistant Examiner* — Kathleen Walsh
(74) *Attorney, Agent, or Firm* — Jianq Chyun IP Office

(57) ABSTRACT

A method and a device for generating a three-dimensional image are provided. In the method, in an $N^{th}$ time slot, an $N^{th}$ left-eye image is received and stored in a download buffer of a first memory unit by a first control unit. An $N^{th}$ right-eye image is received and stored in a download buffer of a second memory unit by a second control unit, where N is a positive integer from 1 to M, and M is a positive integer. In an $(N+1)^{th}$ time slot, the $N^{th}$ right-eye image is received from the second control unit through a data transmission interface and stored in a receive buffer of the first memory unit. In an $(N+2)^{th}$ time slot, the $N^{th}$ left-eye image and the $N^{th}$ right-eye image are combined into an $N^{th}$ three-dimensional image stored in a display buffer of the first memory unit for real time display.

20 Claims, 5 Drawing Sheets

(56) References Cited

U.S. PATENT DOCUMENTS

| | | | |
|---|---|---|---|
| 2011/0234763 A1* | 9/2011 | Hwang et al. | 348/47 |
| 2012/0002009 A1* | 1/2012 | Ikuta et al. | 348/43 |
| 2012/0093394 A1* | 4/2012 | Li | 382/154 |
| 2012/0147145 A1* | 6/2012 | Yamaguchi | 348/47 |
| 2012/0169846 A1* | 7/2012 | Li et al. | 348/46 |
| 2012/0188438 A1* | 7/2012 | Koh | 348/360 |
| 2012/0249757 A1* | 10/2012 | Fujinami | 348/51 |
| 2013/0021450 A1* | 1/2013 | Yoshizawa | 348/47 |
| 2013/0038699 A1* | 2/2013 | Hayashi | 348/47 |
| 2013/0169758 A1* | 7/2013 | Pan et al. | 348/47 |

* cited by examiner

METHOD AND DEVICE FOR GENERATING THREE-DIMENSIONAL IMAGE

CROSS-REFERENCE TO RELATED APPLICATION

This application claims the priority benefit of Taiwan application serial no. 101111399, filed on Mar. 30, 2012. The entirety of the above-mentioned patent application is hereby incorporated by reference herein and made a part of this specification.

BACKGROUND OF THE INVENTION

1. Field of the Invention

The invention relates to an image processing technique, and more particularly, to a method and a device for generating a three-dimensional image.

2. Description of Related Art

With the rapid development of the technology and the image capturing technique, many manufacturers have researched and developed the three-dimensional image capturing technique with enthusiasm. Recently, in addition to watching different types of three-dimensional (3D) images using three-dimensional image receiving device (such 3D eyeglasses), an auto-stereoscopic display technique has been developed. As a result, three-dimensional image capturing devices and display devices that are suitable for customer use are launched to markets successively.

When an object is seen by human's eyes with slightly different angles, human's eyes will see two images with slight differences which are called binocular disparity or retinal disparity. A brain combines the two images with slight differences into a single object with layers and depths, and then a 3D impression is generated in the human's brain.

Thus, three-dimensional image capturing devices have to capture and provide images respectively for a left eye and a right eye. Most of the current methods use different capturing devices to capture a plurality of images from different angles and then perform post-processing to synthesize the images, or use two independent lenses disposed on main bodies of capturing devices so as to capture images in simulation of the right and left eyes of viewers. It is known that three-dimensional capturing devices having a single processor can only process a two-dimensional image from either the left eye or the right eye in a time slot and then generate a three-dimensional image by integrating two-dimensional images of left and right eyes according to a three-dimensional image format, while consuming much time for processing and waiting. For this reason, it is necessary to provide a procedure with higher efficiency in generating three-dimensional images, so that the function of live view on a three-dimensional image capturing device is provided.

SUMMARY OF THE INVENTION

Accordingly, the invention provides a method and a device for generating a three-dimensional image, ensuring exposures of dual sensors are controlled synchronously and live view images in three-dimensional format are generated.

The invention provides a method for generating a three-dimensional image, the method being applied to a three-dimensional image generating device including a first memory unit, a first control unit, a second memory unit and a second control unit. The method for generating the three-dimensional image includes the following steps. In an $N^{th}$ time slot, an $N^{th}$ left-eye image is received and stored in a download buffer of the first memory unit by the first control unit, and an $N^{th}$ right-eye image is received and stored in a download buffer of the second memory unit by the second control unit, wherein N is a positive integer from 1 to M, and M is another positive integer which is greater than or equal to 1. Then, in an $(N+1)^{th}$ time slot, the $N^{th}$ right-eye image is received from the second control unit through a data transmission interface and is stored in a receive buffer of the first memory unit. Then, in an $(N+2)^{th}$ time slot, the $N^{th}$ left-eye image and the $N^{th}$ right-eye image are combined into an $N^{th}$ three-dimensional image stored in a display buffer of the first memory unit so as to be displayed by a three-dimensional display device.

In an embodiment of the invention, the step of receiving the $N^{th}$ left-eye image and the $N^{th}$ right-eye image in the $N^{th}$ time slot includes capturing the $N^{th}$ left-eye image and transmitting the $N^{th}$ left-eye image to the first control unit by a first image sensor, and capturing the $N^{th}$ right-eye image and transmitting the $N^{th}$ right-eye image to the second control unit by a second image sensor.

In an embodiment of the invention, a required time for receiving and storing the $N^{th}$ right-eye image from the above-mentioned second control unit is less than a required time for receiving and storing the $N^{th}$ left-eye image from the first image sensor.

In an embodiment of the invention, the step of capturing images by the first image sensor and the second image sensor includes determining sizes of images captured by the first image sensor and the second image sensor according to a bandwidth of a data transmission interface and a frame rate of the three-dimensional display device.

In an embodiment of the invention, the step of combining the $N^{th}$ left-eye image and the $N^{th}$ right-eye image to generate the $N^{th}$ three-dimensional image includes that, first, combining the $N^{th}$ left-eye image and the $N^{th}$ right-eye image to generate an $N^{th}$ combined image according to a three-dimensional image format and performing a parallax adjustment; then, enlarging the $N^{th}$ combined image to p times so as to generate the $N^{th}$ three-dimensional image applied to be displayed by the three-dimensional display device, wherein p is a positive integer.

In an embodiment of the invention, a size of the $N^{th}$ left-eye image and the $N^{th}$ right-eye image is 6x*9x, and a size of the $N^{th}$ combined image is 16x*9x, and a size of the $N^{th}$ three-dimensional image is 16px*9px, wherein x is a positive integer.

In an embodiment of the invention, the method for generating the three-dimensional image further includes controlling the first image sensor and the second image sensor to capture the $N^{th}$ left-eye image and the $N^{th}$ right-eye image synchronously.

In an embodiment of the invention, the method for generating the three-dimensional image further includes that in the $N^{th}$ time slot, an exposure parameter is detected and calculated. The exposure parameter is set when the $(+1)^{th}$ time slot starts and after a delay time. In the $(N+2)^{th}$ time slot, an $(N+2)^{th}$ left-eye image and an $(N+2)^{th}$ right-eye image are captured according to the exposure parameter.

In an embodiment of the invention, the method for generating the three-dimensional image further includes providing the first memory unit having three download buffers, two receive buffers and two display buffers.

In an embodiment of the invention, the method for generating the three-dimensional image further includes providing the second memory unit having two download buffers.

The invention further provides a three-dimensional image generating device including a first memory unit, a first control unit, a second memory unit and a second control unit. The first memory unit includes a download buffer, a receive buffer and a display buffer. The first control unit is coupled to the first memory unit, receives and stores the $N^{th}$ left-eye image in the download buffer of the first memory unit in the $N^{th}$ time slot. The second memory unit includes a download buffer. The second control unit is coupled to the second memory unit, receives and stores the $N^{th}$ right-eye image in the download buffer of the second memory unit in the $N^{th}$ time slot, wherein N is a positive integer from 1 to M, and M is another positive integer which is greater than or equal to 1. In the $(N+1)^{th}$ time slot, the first control unit receives the $N^{th}$ right-eye image from the second control unit via the data transmission interface and stores the $N^{th}$ right-eye image in the receive buffer of the first memory unit. In the $(N+2)^{th}$ time slot, the first control unit combines the $N^{th}$ left-eye image and the $N^{th}$ right-eye image to generate the $N^{th}$ three-dimensional image which is stored in the display buffer of the first memory unit so as to be displayed by the three-dimensional display device.

In an embodiment of the invention, the first control unit further includes an image processing unit that combines the $N^{th}$ left-eye image and the $N^{th}$ right-eye image according to the three-dimensional image format and performs the parallax adjustment to generate the $N^{th}$ combined image. The image processing unit further enlarges the combined $N^{th}$ image to p times to generate the $N^{th}$ three-dimensional image applied to be displayed by the three-dimensional display device, wherein p is a positive integer.

In an embodiment of the invention, the first control unit further includes a sensor control unit which controls the first image sensor and the second image sensor to capture the $N^{th}$ left-eye image and the $N^{th}$ right-eye image synchronously.

According to the above descriptions, the invention provides the method and the device for generating the three-dimensional image by dividing the memory unit into a plurality of buffer blocks with different functions to achieve a parallel operation and thereby greatly reducing the required time for image processing. Therefore, the live view image of the three-dimensional format is provided.

In order to make the aforementioned features and strengths of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Herein, the drawings illustrate embodiments of the invention and, together with the description, serve to explain the principles of the invention.

DESCRIPTION OF EMBODIMENTS

The invention describes how two groups of image sensors having different view angles and control units capture left-eye/right-eye images synchronously. The invention also describes how to download, receive, and combine left-eye/right-eye image synchronously via memory disposition, and combine two images all through one control unit according to rules of a three-dimensional format so as to generate a live view image of the three-dimensional format. In order to make the content of the invention more comprehensible, embodiments are described below as examples according to which the invention may actually be realized.

Figure 1:
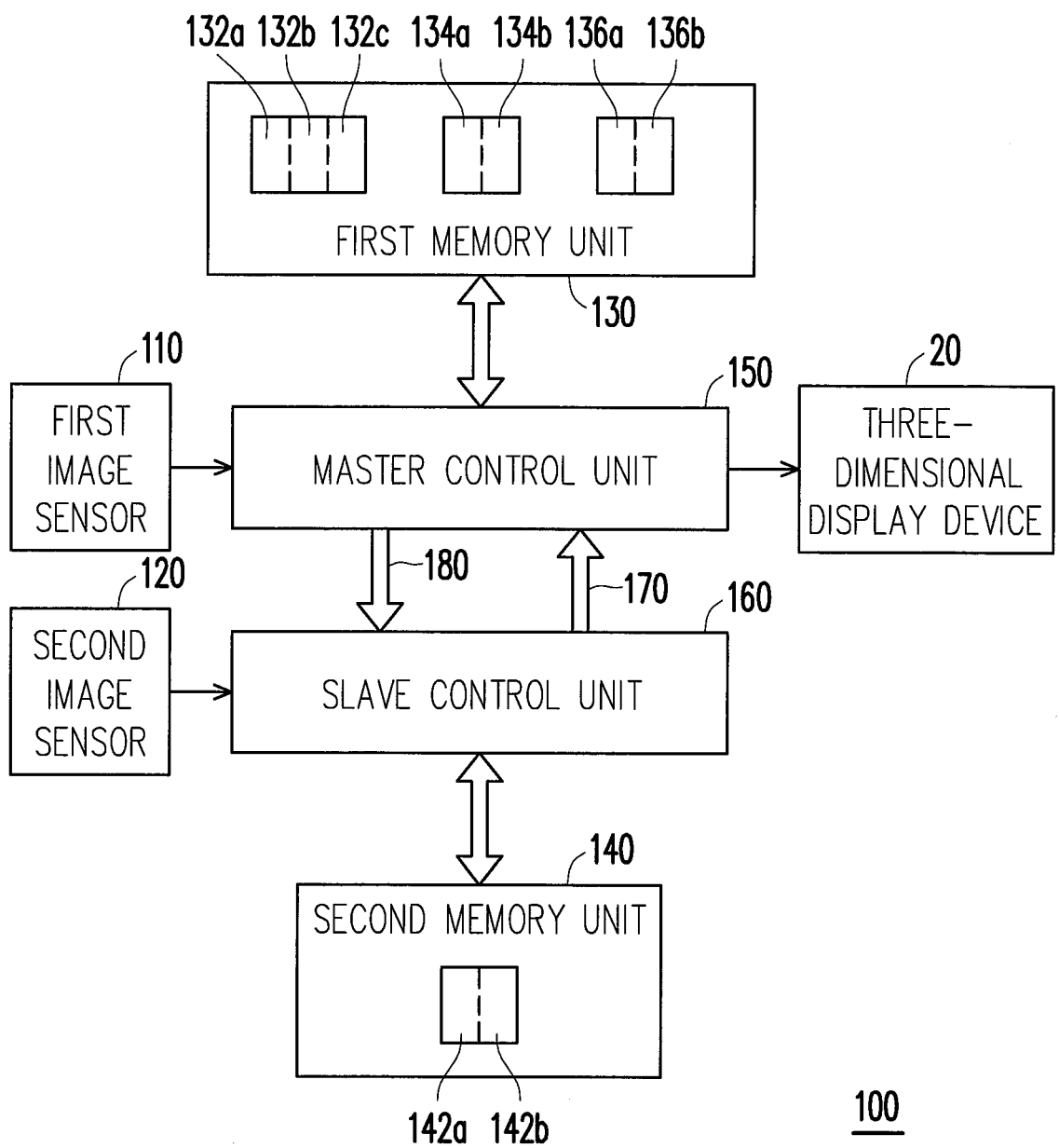
FIG. 1 is a block diagram of a three-dimensional image generating device according to an embodiment of the invention.

FIG. 1 is a block diagram of a three-dimensional image generating device according to an embodiment of the invention. Referring to FIG. 1, a three-dimensional image generating device 100 of the present embodiment is, for example, a digital camera, a digital camcorder or a smart phone or a tablet computer having an image processing function but is not limited thereto. The three-dimensional image generating device 100 includes a first image sensor 110, a second image sensor 120, a first memory unit 130, a second memory unit 140, a master control unit 150 (that is, the first control unit), and a slave control unit 160 (that is, the second control unit); functions thereof are described below.

The first image sensor 110 and the second image sensor 120 include lenses and photosensitive elements, wherein the photosensitive elements are, for example, charge coupled devices (CCD) and complementary metal-oxide semiconductor (CMOS) devices. To facilitate the description of the invention, in the present embodiment, the first image sensor 110 captures a left-eye image, and the second image sensor 120 captures a right-eye image. However, in another embodiment, the first image sensor 110 may capture the right-eye image, and the second image sensor 120 may capture the left-eye image.

The first memory unit 130 and the second memory unit 140 are implemented as, for example, a dynamic random access memory (DRAM), wherein the first memory unit 130 includes at least one download buffer (the first memory unit 130 includes three download buffers 132a, 132b, and 132c in the present embodiment), at least one receive buffer (the first memory unit 130 includes two receive buffers 134a and 134b in the present embodiment), and at least one display buffer (the first memory unit 130 includes two display buffers 136a and 136b in the present embodiment), and wherein the second memory unit 140 includes at least one download buffer (the second memory unit 140 includes two download buffers 142a and 142b in the present embodiment).

The master control unit 150 is implemented by, for example, an application-specific integrated circuit (ASIC) used for image processing or by a field programmable gate array (FPGA), wherein the master control unit 150 is used to receive the left-eye image captured by the first image sensor 110 and store the left-eye image in the download buffer of the first memory unit 130.

The slave control unit 160 is implemented by, for example, an application-specific integrated circuit used for image processing or by a field programmable gate array, wherein the slave control unit 160 is used to receive the right-eye image captured by the second image sensor 120 and store the right-eye image in the download buffer of the second memory unit 140.

It should be noted that the master control unit 150 receives the right-eye image from the slave control unit 160 via a data transmission interface 170 and stores the right-eye image in the receive buffer of the first memory unit 130. The master control unit 150 then combines the left-eye image and the right-eye image and stores a combined image in the display buffer of the first memory unit 130. Hence, the master control unit 150 provides three-dimensional images to a three-dimensional display device 20 to be displayed in real time. The data transmission interface 170 is, for example, a universal serial bus (USB) interface or a secure digital input/output (SDIO) interface. Furthermore, the master control unit 150 transmits a control command to the slave control unit 160 via a command transmission interface 180. The command transmission interface 180 is, for example, the secure digital input/output (SDIO) interface or an inter-integrated circuit ($I^2C$) interface, but is not limited thereto.

Figure 2:
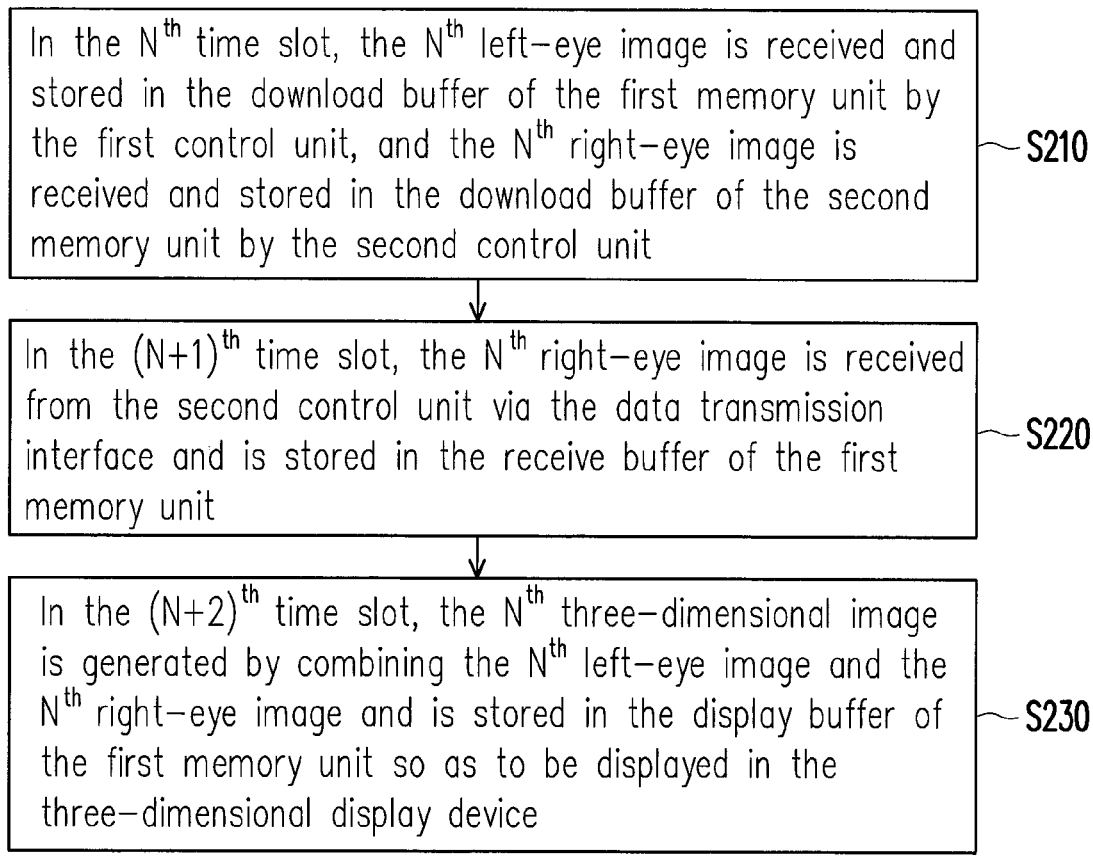
FIG. 2 is a flow diagram of a method for generating a three-dimensional image according to an embodiment of the invention.

FIG. 2 is a flow diagram of a method for generating a three-dimensional image according to an embodiment of the invention. A method of the present embodiment is applied to the three-dimensional image generating device 100 of FIG. 1. The steps of the method of the present embodiment are described in detail below with reference to each component of the three-dimensional image generating device 100.

First of all, in a step S210, in an $N^{th}$ time slot, the master control unit 150 receives the $N^{th}$ left-eye image and stores the $N^{th}$ left-eye image in the download buffer of the first memory unit 130. Meanwhile, in the $N^{th}$ time slot, the slave control unit 160 receives the $N^{th}$ right-eye image synchronously and stores the $N^{th}$ right-eye image in the download buffer of the second memory unit 140, wherein N is a positive integer from 1 to M, and M is another positive integer greater than or equal to 1. Specifically, M is a number of images that may be captured by the three-dimensional image generating device 100 from an beginning to an end of capturing images.

Figure 3:
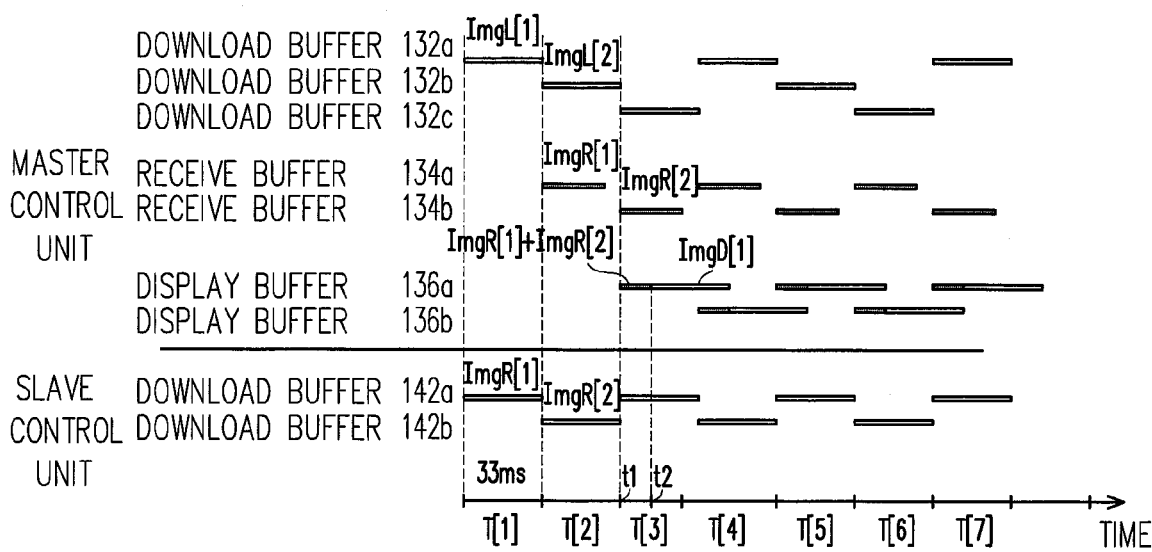
FIG. 3 is a schematic timing diagram of generating a three-dimensional image according to an embodiment of the invention.

The description is made with an aid of FIG. 3. FIG. 3 is a timing diagram of generating a three-dimensional image according to an embodiment of the invention. As shown in FIG. 3, during a first time slot T[1], the master control unit 150 receives a left-eye image ImgL[1] captured by the first image sensor 110 and stores the left-eye image ImgL[1] in the download buffer 132a. Meanwhile, the slave control unit 160 receives a right-eye image ImgR[1] captured by the second image sensor 120 and stores the right-eye image ImgR[1] in the download buffer 142a during the first time slot T[1].

Herein, it should be noted that, if a frame rate of the three-dimensional display 20 is 30 frames per second (fps), a time for the master control unit 150 to receive and store the left-eye image ImgL[1] is about 33 microseconds (ms); similarly, a time for the slave control unit 160 to receive and store the right-eye image ImgR[1] is about 33 microseconds (ms).

It is worthy to note that the master control unit 150 and the slave control unit 160 examine whether the left-eye image ImgL[1] and the right-eye image ImgR[1] are received correctly and stored completely before the first time slot T[1] ends. If the left-eye image ImgL[1] is received correctly and stored completely, then when a second time slot T[2] starts, the master control unit 150 begins to capture and download a left-eye image ImgL[2] and stores the left-eye image ImgL[2] in another download buffer 132b; if the right-eye image ImgR[1] is received correctly and stored completely, then when the second time slot T[2] starts, the slave control unit 160 begins to capture and download the right-eye image ImgR[2] and then stores the right-eye image ImgR[2] in another download buffer 142b, which is performed likewise until the first image sensor 110 and the second image sensor 120 stop capturing images. In the present embodiment, the number M of the images is 7.

Subsequently, in a step S220, during an $(N+1)^{th}$ time slot, the master control unit 150 receives the $N^{th}$ right-eye image from the slave control unit 160 via the data transmission interface 170 and then stores the $N^{th}$ right-eye image in the receive buffer of the first memory unit 130. Keeping referring to FIG. 3, the master control unit 150 receives the right-eye image ImgR[1] via the data transmission interface 170 and then stores the right-eye image ImgR[1] in the receive buffer 134a. It is worthy to note that the time for the master control unit 150 to store the right-eye image ImgR[1] in the receive buffer 134a has to be less than 33 microseconds, so as to conform to a real-time play of the three-dimensional display device 20. Similarly, the master control unit 150 examines whether the right-eye image ImgR[1] is received correctly and stored completely before the second time slot T[2] ends. If so, then in a third time slot T[3], the master control unit 150 continues to receive the right-eye image ImgR[2] from the slave control unit 160 and then stores the right-eye image ImgR[2] in another receive buffer 134b.

In a step S230, during an $(N+2)^{th}$ time slot, the master control unit 150 combines the $N^{th}$ left-eye image and the $N^{th}$ right-eye image so as to generate the $N^{th}$ three-dimensional image which is stored in the display buffer of the first memory unit 130 so as to be displayed by the three-dimensional display device 20. Keeping referring to FIG. 3, after the left-eye image ImgL[1] and the right-eye image ImgR[1] are both received completely, the master control unit 150 combines the left-eye image ImgL[1] and the right-eye image ImgR[1] during the third time slot T[3], so as to generate a three-dimensional image ImgD[1]. The master control unit 150 stores the three-dimensional image ImgD[1] in the display buffer 136a. It should be noted that a time point t1 to a time point t2 is a time needed for combining the left-eye image ImgL[1] and the right-eye image ImgR[1]. And during the time of displaying the three-dimensional image ImgD[1], the master control unit keeps combining the left-eye image ImgL[2] and the right-eye image ImgL[2] ImgR[2], thereby generating a three-dimensional image ImgD[2] before the three-dimensional image ImgD [1] is finished displaying.

The third time slot T[3] of FIG. 3 shows that the three-dimensional image generating device 100 may execute the following operations synchronously: capturing the left-eye/right-eye images respectively, receiving the images from the slave control unit 160 by the master control unit 150, combining the left-eye images and the right-eye images and displaying three-dimensional images. In the present embodiment, since each component of the three-dimensional image generating device 100 is implemented by hardware, and with dispositions and operations of the buffers having different functions in memory units, the three-dimensional image generating device 100 of the present embodiment achieves parallel operations, thereby reducing time for generating three-dimensional images, and the function of live view is provided in the three-dimensional display device 20.

Figure 4:
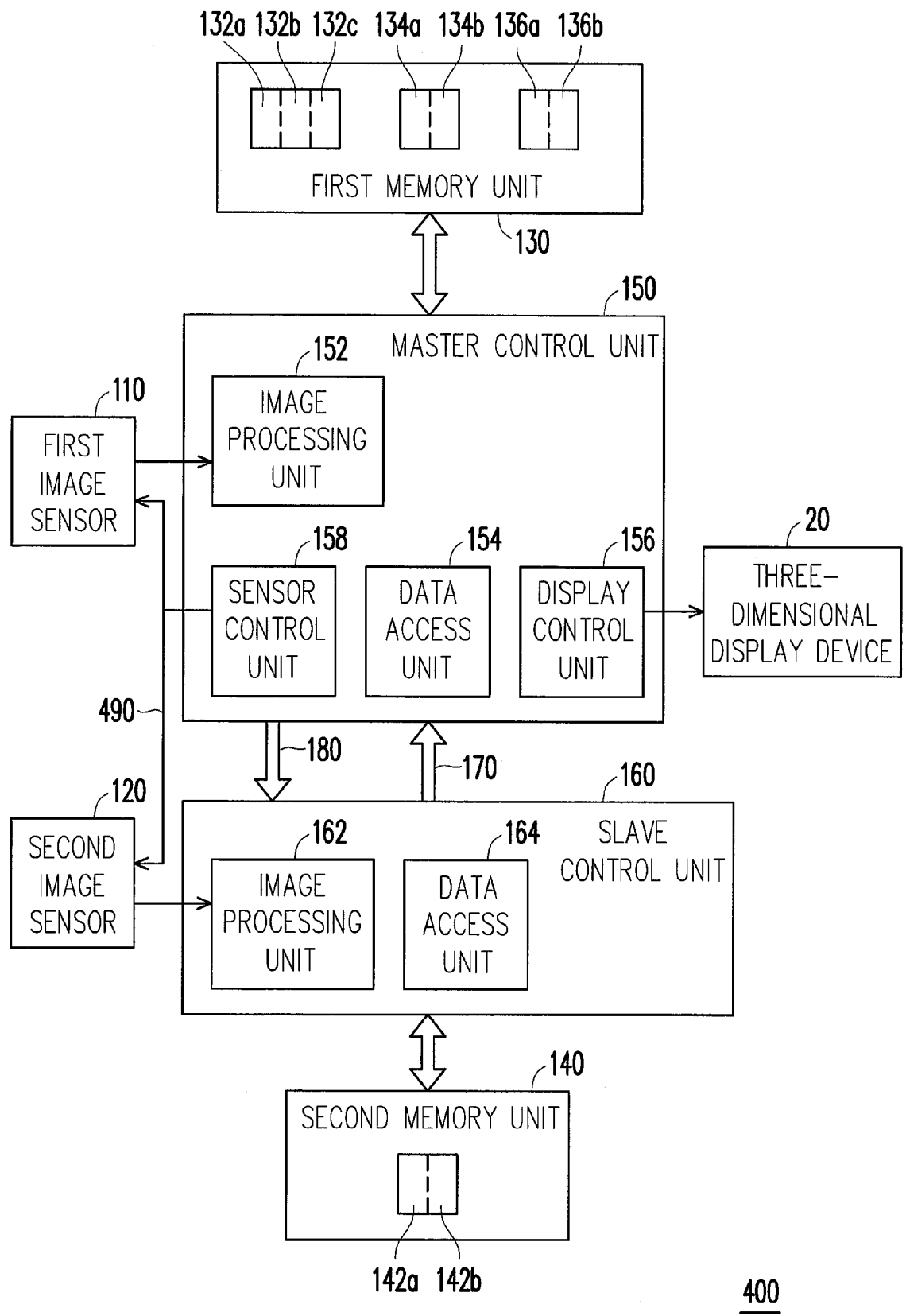
FIG. 4 is a block diagram of a three-dimensional image generating device according to another embodiment of the invention.

Another embodiment is described below as an example according to which the invention may actually be realized. FIG. 4 is a block diagram of a three-dimensional image generating device according to another embodiment of the invention. It should be mentioned that FIG. 4 is a detailed way of embodiment of the three-dimensional image generating device 100 in FIG. 1. Therefore, only the differences between FIG. 4 and FIG. 1 are described below.

The master control unit 150 of a three-dimensional image generating device 400 includes an image processing unit 152, a data access unit 154, a display control unit 156, and a sensor control unit 158. The slave control unit 160 of the three-dimensional image generating device 400 includes an image processing unit 162, and a data access unit 164.

The image processing units 152 and 162 receive respectively images captured by the first and second image sensors 110 and 120 and store the captured images in the first and second memory units 130 and 140. The image processing unit 152 further includes combining the left-eye image and the right-eye image according to the three-dimensional image format and performing the parallax adjustment so as to generate a combined image. Then, the image processing unit 152 enlarges the combined image to p times so as to generate the three-dimensional image applied to be displayed by the three-dimensional display device 20, wherein p is a positive integer.

The master control unit 150 further includes the sensor control unit 158 to control the image sensors 110 and 120 to capture the left-eye image and the right-eye image synchronously. In other words, in the three-dimensional image generating device 400, the master control unit 150 controls activations of the two image sensors and prior to the activations, a plurality of hardware parameters have to be set respectively by the master control unit 150 and the slave control unit 160. In addition, the sensor control unit 158 also controls settings of exposure parameters of the first and second image sensors 110 and 120, such that an exposure time of the first image sensor 110 is equal to an exposure time of the second image sensor 120 during a same time slot.

The data access unit 154 receives data such as images from the data access unit 164 via the data transmission interface 170. Furthermore, the data access unit 154 performs data access operations such as reading or writing on the first memory unit 130; similarly, the data access unit 164 performs data access operation such as reading or writing on the second memory unit 140.

The display control unit 156 transmits the three-dimensional image in the display buffer 136 to the three-dimensional display device 20 for display. In an embodiment, the three-dimensional display device 20 is, for example, a display screen on the three-dimensional image generating device 400 for displaying three-dimensional images. In another embodiment, the three-dimensional display device 20 is, for example, a three-dimensional television (3D TV) having a high definition multimedia interface (HDMI), and the display control unit 156 also has a high definition multimedia interface that transmits three-dimensional images to the 3D TV.

A control flow for generating three-dimensional images by the three-dimensional image generating device 400 as shown in FIG. 4 is substantially the same as a control flow of the above-mentioned embodiment, and repeated descriptions are omitted herein. However, accelerating the speed of capturing and accessing images is necessary in order to provide live view images of the three-dimensional format. Accordingly, the following is another applied embodiment to describe size variation of the three-dimensional image of the invention during a generation process.

Figure 5:
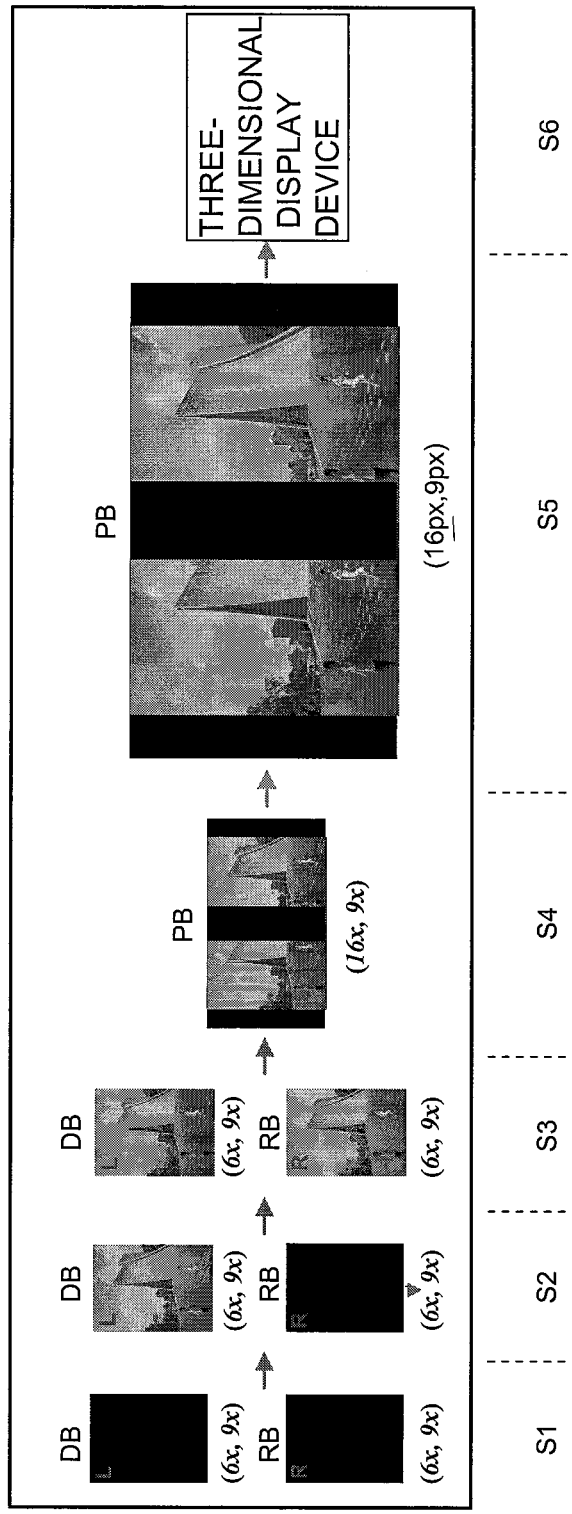
FIG. 5 is a schematic diagram of size variation of a three-dimensional image according to another embodiment of the invention.

FIG. 5 is a schematic diagram of size variation of three-dimensional images according to another embodiment of the invention. Referring to FIGS. 4 and 5, a download buffer DB is, for example, one of the download buffers 132a, 132b, and 132c in the first memory unit 130. A receive buffer RB is, for example, one of the receive buffers 134a and 134b in the first memory unit 130. A display buffer PB is, for example, one of the display buffers 136a and 136b in the first memory unit 130.

A step S1 starts in $0^{th}$ time slot T[0], and the first and second image sensors 110 and 120 have not started to capture images yet; therefore, no image data exist in the download buffer DB and the receive buffer RB.

A step S2 starts in the first time slot T[1], and the first and second image sensors 110 and 120 have started to capture and store images; however, image captured by the second image sensor 120 is stored in the second memory unit 140. Thus, the download buffer DB of the first memory unit 130 stores a left-eye image L, while the receive buffer RB does not have any image data.

A step S3 starts in the second time slot T[2], and the master control unit 150 receives and stores a right-eye image R from the slave control unit 160 via the data access unit 154. Now, the left-eye image L in the download buffer DB and the right-eye image R in the receive buffer RB of the first memory unit 130 are ready to combine in the next time slot. For example, a size of the left-eye image L and right-eye image R is 6x*9x (pixels), wherein x is a positive integer. In the present embodiment, the size of the left-eye image L and right-eye image R is, for example, 360*540 (pixels); thus x is equal to 60.

A step S4 starts in the third time slot T[3], and the image processing unit 152 of the master control unit 150 combines the left-eye image L and the right-eye image R according to the three-dimensional image format and performs the parallax adjustment, wherein the above-mentioned three-dimensional image format is, for example, a side-by-side horizontal format. In more detail, a display specification of the three-dimensional television having the HDMI is usually 16:9. However, the photosensitive element of the image sensor is mostly set to capture images with a ratio of 4:3, wherein the maximum ratio is up to 12:9 only. The image processing unit 152 adds black lines on both sides of the left-eye image L and the right-eye image R so that a size of the combined image conforms to the proportion of the display specification of the three-dimensional television so as to prevent a distortion of the combined image. In the present embodiment, the size of the combined image is, for example, 960*540 (pixels).

Because the left-eye image L and the right-eye image R are captured by different image sensors, capturing angles thereof are not the same. Consequently, in a step S4, the image processing unit 152 further includes performing the parallax adjustment to adjust the combination type and position of the left-eye image L and right-eye image R by determining overlapping areas of scenes in the left-eye image L and right-eye image R.

Next, in a step S5, the image processing unit 152 further enlarges the combined image to p times so as to generate the three-dimensional image applied to be displayed by the three-dimensional display device 20, wherein p is a positive integer. Assuming that the size of the three-dimensional image displayed by the three-dimensional display device 20 is 1920*1080 (pixels), the combined image of the present embodiment has to be enlarged to 2 times (i.e., p=2). Thereafter, in a step S6, the display control unit 156 transmits the three-dimensional image to the three-dimensional display device 20 for display.

Base on the aforementioned, the time for the master control unit 150 to receive the right-eye image R from the slave control unit 160 via the data transmission interface 170 has to be less than the frame rate of the three-dimensional display device 20 so as to achieve real time display. Because the smaller the size of the captured images is, the shorter the time of processing and receiving is, and thus the setting of image sizes is determined by the bandwidth provided by the data transmission interface 170 and by the frame rate of the three-dimensional display device 20. An image enlargement ratio p is defined after the size of the captured images is confirmed.

Figure 6:
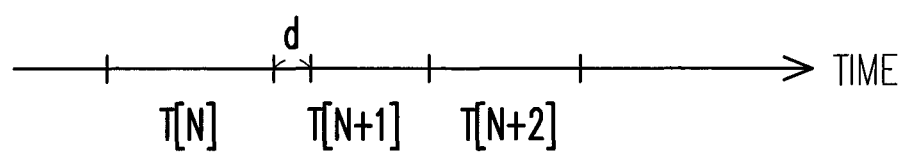
FIG. 6 is a schematic diagram of an exposure parameter setting according to another embodiment of the invention.

In addition to providing the three-dimensional image in real time, in the present embodiment, the three-dimensional image generating device 400 also controls and keeps an exposure time of the first and second image sensors 110 and 120 to be in a synchronous state. FIG. 6 is a schematic diagram of an exposure parameter setting according to another embodiment of the invention.

Referring to FIGS. 4 and 6, the sensor control unit 158 controls the first and second image sensors 110 and 120 to capture images synchronously via, for example, an I²C interface 490. The image processing unit 152 of the master control unit 150 further includes detecting and calculating an exposure parameter in the $N^{th}$ time slot.

The master control unit 150 and the slave control unit 160 respectively sets the exposure parameter after the $(N+1)^{th}$ time slot starts. In detail, the master control unit 150 and the slave control unit 160 begin to set the exposure parameter only after a delay time d, so as to prevent that only one of the master control unit 150 and slave control unit 160 completes setting and directly executes the exposure parameter. In other words, the master control unit 150 and the slave control unit 160 are allowed to have a whole time slot for transmitting the control command and setting the exposure parameter because of the delay time d.

In the $(N+2)^{th}$ time slot, the sensor control unit 158 controls the first and second image sensors 110 and 120 to capture the $(N+2)^{th}$ left-eye image and the $(N+2)^{th}$ right-eye image according to the set exposure parameter. Hence, the left-eye image and the right-eye image captured in the $(N+2)^{th}$ time slot have a same exposure time setting.

In conclusion, the invention provides the method and the device for generating the three-dimensional image by dividing the memory unit into a plurality of buffer blocks with different functions to achieve a parallel operation so as to greatly reduce the required time for image processing. Therefore, the live view image of the three-dimensional format is provided. In addition, the invention also controls and keeps the exposure parameter of the two image sensors synchronously so as to improve qualities of the three-dimensional image according to variation of environment brightness by appropriately and synchronously adjusting the exposure time of the two image sensors while the three-dimensional image is being displayed.

Although the invention has been disclosed by the above embodiments, they are not intended to limit the invention. It will be apparent to people of ordinary skill in the art that modifications and variations to the invention may be made without departing from the spirit and the scope of the invention. Therefore, the protecting scope of the invention is defined by the appended claims.

What is claimed is:

1. A method for generating a three-dimensional image, applied to a three-dimensional image generating device comprising a first memory unit, a first control unit, a second memory unit and a second control unit, the method for generating the three-dimensional image comprising:

receiving an $N^{th}$ left-eye image and storing the $N^{th}$ left-eye image in a download buffer of the first memory unit by the first control unit in an $N^{th}$ time slot, and receiving an $N^{th}$ right-eye image and storing the $N^{th}$ right-eye image in a download buffer of the second memory unit by the second control unit in the $N^{th}$ time slot, wherein N is a positive integer from 1 to M, and M is a positive integer which is greater than or equal to 1;

receiving the $N^{th}$ right-eye image from the second control unit via a data transmission interface and storing the $N^{th}$ right-eye image in a receive buffer of the first memory unit in an $(N+1)^{th}$ time slot; and combining the $N^{th}$ left-eye image and the $N^{th}$ right-eye image into an $N^{th}$ three-dimensional image and storing the $N^{th}$ three-dimensional image in a display buffer of the first memory unit in an $(N+2)^{th}$ time slot so as to be displayed in a three-dimensional display device.

2. The method for generating the three-dimensional image as claimed in claim 1, wherein the step of receiving the $N^{th}$ left-eye image and the $N^{th}$ right-eye image in the $N^{th}$ time slot comprises:

capturing the $N^{th}$ left-eye image and transmitting the $N^{th}$ left-eye image to the first control unit by a first image sensor, and capturing the $N^{th}$ right-eye image and transmitting the $N^{th}$ right-eye image to the second control unit by a second image sensor.

3. The method for generating the three-dimensional image as claimed in claim 2, wherein a required time for receiving and storing the $N^{th}$ right-eye image from the second control unit is less than a required time for receiving and storing the $N^{th}$ left-eye image from the first image sensor.

4. The method for generating the three-dimensional image as claimed in claim 2, wherein the step of capturing images by the first image sensor and the second image sensor comprises:

determining sizes of images captured by the first image sensor and the second image sensor according to a bandwidth of the data transmission interface and a frame rate of the three-dimensional display device.

5. The method for generating the three-dimensional image as claimed in claim 1, wherein the step of combining the $N^{th}$ left-eye image and the $N"$ right-eye image into the $N^{th}$ three-dimensional image comprises:

combining the $N^{th}$ left-eye image and the $N^{th}$ right-eye image and performing a parallax adjustment according to a three-dimensional image format so as to generate an $N^{th}$ combined image; and enlarging the $N^{th}$ combined image to p times to generate the $N^{th}$ three-dimensional image applied to be displayed by the three-dimensional display device, wherein p is a positive integer.

6. The method for generating the three-dimensional image as claimed in claim 5, wherein a size of the $N^{th}$ left-eye image and the $N^{th}$ right-eye image is 6x*9x, a size of the $N^{th}$ combined image is 16x*9x, and a size of the $N^{th}$ three-dimensional image is 16px*9px, wherein x is a positive integer.

7. The method for generating the three-dimensional image as claimed in claim 2, further comprising:

controlling the first image sensor and the second image sensor to capture the $N^{th}$ left-eye image and the $N^{th}$ right-eye image synchronously.

8. The method for generating the three-dimensional image as claimed in claim 1, further comprising:

detecting and calculating an exposure parameter in the $N^{th}$ time slot;

setting the exposure parameter when the $(N+1)^{th}$ time slot starts and after a delay time; and capturing an $(N+2)^{th}$ left-eye image and an $(N+2)^{th}$ right-eye image according to the exposure parameter in the $(N+2)^{th}$ time slot.

9. The method for generating the three-dimensional image as claimed in claim 1, further comprising:

providing the first memory unit having three download buffers, two receive buffers and two display buffers.

10. The method for generating the three-dimensional image as claimed in claim 1, further comprising:

providing the second memory unit having two download buffers.

11. A three-dimensional image generating device comprising:
- a first memory unit, having a download buffer, a receive buffer and a display buffer;
- a first control unit, coupled to the first memory unit, and receiving an $N^{th}$ left-eye image in an $N^{th}$ time slot and storing the $N^{th}$ left-eye image in the download buffer of the first memory unit;
- a second memory unit, having a download buffer; and
- a second control unit, coupled to the second memory unit, and receiving an $N^{th}$, right-eye image in the $N^{th}$ time slot and storing the $N^{th}$ right-eye image in the download buffer of the second memory unit, N being a positive integer from 1 to M, and M is a positive integer which is greater than or equal to 1,
- wherein in an $(N+1)^{th}$ time slot, the first control unit receives the $N^{th}$ right-eye image from the second control unit via a data transmission interface and stores the $N^{th}$ right-eye image in the receive buffer of the first memory unit,
- wherein in an (N+2) time slot, the first control unit combines the $N^{th}$ left-eye image and the $N^{th}$ right-eye image to generate an $N^{th}$ three-dimensional image and stores the $N^{th}$ three-dimensional image in the display buffer of the first memory unit so as to be displayed by a three-dimensional display device.

12. The three-dimensional image generating device as claimed in claim 11, further comprising:
- a first image sensor unit, coupled to the first control unit, and capturing the $N^{th}$ left-eye image in the $N^{th}$ time slot and transmitting the $N^{th}$ left-eye image to the first control unit; and
- a second image sensor, coupled to the second control unit, and capturing the $N^{th}$ right-eye image in the $N^{th}$ time slot and transmitting the $N^{th}$ right-eye image to the second control unit.

13. The three-dimensional image generating device as claimed in claim 12, wherein:
- a required time for the first control unit to receive and store the $N^{th}$ right-eye image from the second control unit via the data transmission interface is less than a required time for the first control unit to receive and store the $N^{th}$ left-eye image from the first image sensor.

14. The three-dimensional image generating device as claimed in claim 12, wherein:
- the first control unit determines sizes of images captured by the first image sensor and the second image sensor according to a bandwidth of the data transmission interface and a frame rate of the three-dimensional display device.

15. The three-dimensional image generating device as claimed in claim 11, wherein the first control unit further comprises:
- an image processing unit, combining the $N^{th}$ left-eye image and the $N^{th}$ right-eye image according to a three-dimensional image format and performing a parallax adjustment to generate an $N^{th}$ combined image, and enlarging the $N^{th}$ combined image to p times to generate the $N^{th}$ three-dimensional image applied to be displayed by the three-dimensional display device, wherein p is a positive integer.

16. The three-dimensional image generating device as claimed in claim 15, wherein:
- a size of the $N^{th}$ left-eye image and the $N^{th}$ right-eye image is 6x*9x, a size of the $N^{th}$ combined image is 16x*9x, and a size of the $N^{th}$ three-dimensional image is 16px*9px, wherein x is a positive integer.

17. The three-dimensional image generating device as claimed in claim 12, wherein the first control unit further comprises:
- a sensor control unit, controlling the first image sensor and the second image sensor to capture the $N^{th}$ left-eye image and the $N^{th}$ right-eye image synchronously.

18. The three-dimensional image generating device as claimed in claim 17, wherein:
- the first control unit detects and calculates an exposure parameter in the $N^{th}$ time slot and sets the exposure parameter when the $(N+1)^{th}$ time slot starts and after a delay time, and the sensor control unit controls the first image sensor and the second image sensor in the $(N+2)^{th}$ time slot to capture images according to the exposure parameter.

19. The three-dimensional image generating device as claimed in claim 11, wherein the first memory unit comprises three download buffers, two receive buffers and two display buffers.

20. The three-dimensional image generating device as claimed in claim 11, wherein the second memory unit comprises two display download buffers.

* * * * *